United States Patent [19]

Nagahiro et al.

[11] 3,829,892

[45] Aug. 13, 1974

[54] AUTOMATIC TRACKING MATCHING SYSTEM

[75] Inventors: Michinori Nagahiro, Nishinomiya; Masahiro Deguchi; Akio Kuroe, both of Osaka, all of Japan

[73] Assignee: Matsushita Electric Industrial Co., Ltd., Osaka, Japan

[22] Filed: Jan. 8, 1973

[21] Appl. No.: 321,738

[30] Foreign Application Priority Data

Jan. 17, 1972 Japan .................................. 47-7156

[52] U.S. Cl. .......................... 360/73, 360/27, 360/84

[51] Int. Cl. .......................... G11b 5/52, G11b 19/28

[58] Field of Search ........... 179/100.2 S, 100.2 MD, 179/100.1 UC; 178/6.6 A

[56] References Cited

UNITED STATES PATENTS

| | | | |
|---|---|---|---|
| 3,160,704 | 12/1964 | Hollingsworth | 179/100.2 T |
| 3,229,035 | 1/1966 | Bounsall | 179/100.2 T |
| 3,234,323 | 2/1966 | Kihara | 179/100.2 T |
| 3,378,646 | 4/1968 | Shashoua et al. | 179/100.2 S |
| 3,590,167 | 6/1971 | Price et al. | 179/100.2 S |
| 3,651,276 | 3/1971 | Clark | 179/100.2 T |

*Primary Examiner*—Alfred H. Eddleman

[57] ABSTRACT

Control signals with a predetermined level are recorded in parallel with the information signal recording tracks which are recorded upon a recording medium being in parallel with each other, spaced apart from each other by a predetermined distance and inclined at an angle relative to the direction of the transport of the recording medium. The speed of the recording medium is so controlled that the relative position of the control signals relative to the reproducing head or heads or the degree of overlap of the control signals over the information signal recording track may be maintained constant and the level of the control signals reproduced may be maintained constant when the control signals are reproduced by the information signal reproducing head or heads.

10 Claims, 12 Drawing Figures

AUTOMATIC TRACKING MATCHING SYSTEM

BACKGROUND OF THE INVENTION:

The present invention relates to a tracking matching system used when playing back information signals recorded in tracks with a predetermined width on recording medium such as a magnetic tape by means of a reproducing element or elements such as magnetic heads.

In one video tape recording system, video signals are recorded in oblique tracks of a very small width of the order of 100 microns which are inclined at an angle relative to the lengthwise direction of the magnetic tape. In order to attain the tracking matching in playback, the control signals are recorded in the lengthwise direction of the tape in synchronism with the information signal recording tracks so that the control signals may be reproduced by a control head so as to attain the required synchronization in playback. (Such a VTR system has been known as E1AJ Standard Type 1 VTR) In this VTR system the position of the control head with respect to the reproducing head or heads must be adjusted with a higher degree of accuracy. Oththerwise, the video signals recorded by one VTR machine cannot be reproduced correctly by another VTR machine, so that a playback shifter or the like must be provided.

In the conventional VTR reproducing machines, there is provided a control head or an auxiliary video head for reproducing the control signals so as to control the synchronization between the speed of the video reproducing head and the tape speed.

SUMMARY OF THE INVENTION:

One of the objects of the present invention is therefore to provide an automatic tracking matching system which may overcome the above defects encountered in the prior art VTR systems and which may be fabricated at a low cost.

In the automatic tracking matching system, in accordance with the present invention, the control signals required for attaining the tracking matching are reproduced by a reproducing head or heads which are used for reproducing the information signals such as video signals, so that no other head such as a control head will be required. Therefore, the reproducing machines may be fabricated at a low cost.

According to the present invention, the control signals with a predetermined level are recorded in parallel with the information signal recording tracks which are recorded upon a recording medium in parallel with each other and spaced apart from each other by a predetermined distance and at an angle relative to the direction of the transport of the recording medium. In playback, the control signals are reproduced by the information signal reproducing head or heads, and the speed of the recording medium is so controlled that the position of the control signals relative to the reproducing head or heads or the degree of overlap of the control signals over the information signal recording track may be maintained constant and the level of the control signals reproduced may be also maintained constant.

Figure 1:
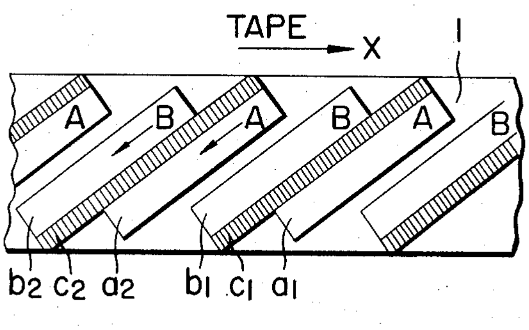
FIG. 1 shows a recording track pattern in accordance with a first embodiment of the present invention.

DESCRIPTION OF THE PREFERRED EMBODIMENTS:

FIG. 1 shows a recording track pattern of a first embodiment of the present invention applied to the two-head helical scanning type video tape recording system. Two video signal tracks $a_1$, $a_2$ and so on and $b_1$, $b_2$ and so on are alternately provided on a magnetic tape 1 for a pair of video heads A and B. The video signal track pattern of the first embodiment is substantially similar to that provided by the conventional VTR systems. Between a pair of video tracks $a_n$ and $b_n$ is interposed a control track $c_n$ (where $n$ = integer) in contact with the video tracks. In the control track $c_n$ is recorded a signal of a predetermined frequency for example less than 100 KHz so that when it is reproduced together with the video signals through the video head assembly it may not interfere the video signals. The magnetic tape 1 is transported in the direction indicated by X. In playback, the tracking matching is attained by controlling the transport of the tape 1 or the rotation of the video head assembly so that the heads A and B may correctly scan the video tracks $a_n$ and $b_n$. Any suitable conventional control system may be used in order to control the transport of the magnetic tape or rotation of the video head assembly. In general when a number of $n$ reproducing heads are used a control track or tracks are provided along every n video tracks.

Figure 2:
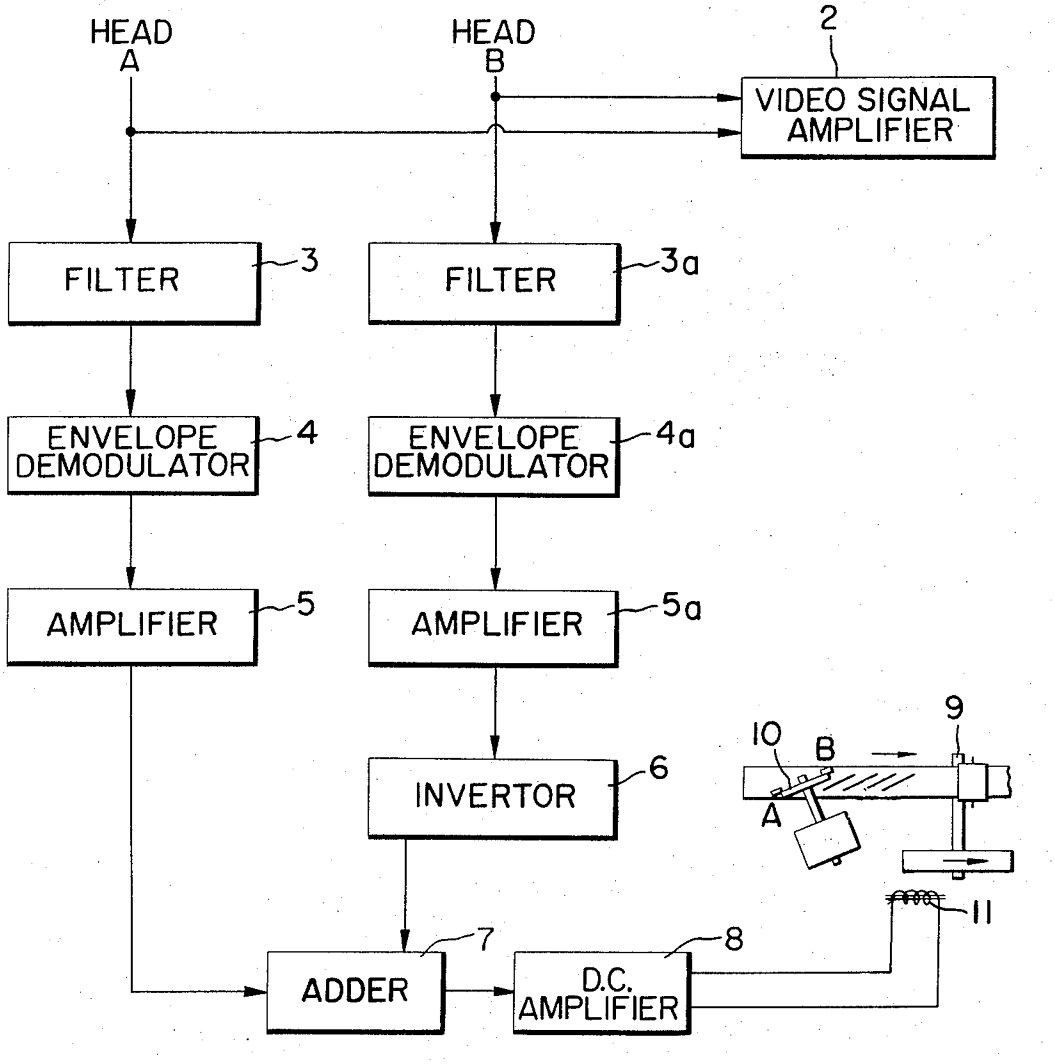
FIG. 2 is a block diagram of a control system used in the first embodiment.
Figure 3:
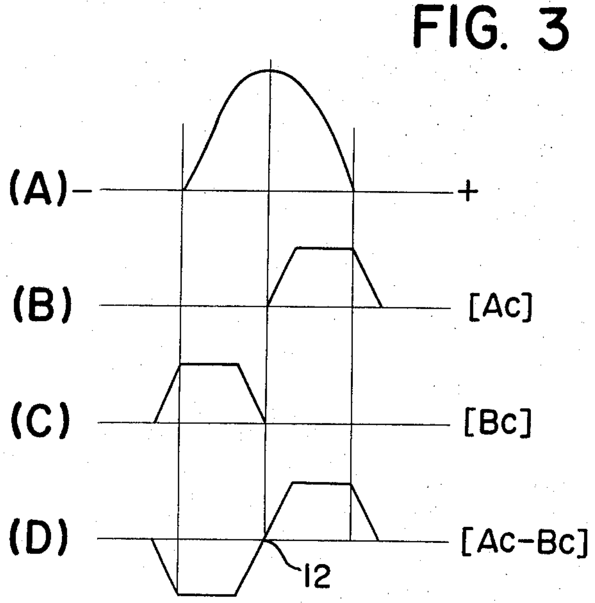
FIG. 3 is a diagram illustrating the relation between the displacement of phase and the level of the signals.

FIG. 2 is a block diagram of a control circuit used in the first embodiment of the present invention, and FIG. 3 is a diagram illustrating the relation between the phases of the video signals and the control signals reproduced respectively. When the magnetic tape 1 is transported with respect to the video head A which is in the optimum tracking state with respect to the video track $a_1$, the head A simultaneously reproduces the control signal on the track $c_1$. When the video head B scans the video track $b_1$ under the optimum conditions it also reproduces the control signal on the control track $c_1$. FIG. 3(A) shows the video signal reproduced by the head A; FIG. 3(B), the control signal reproduced by the head A; FIG. 3(C), the control signal reproduced by the head B; and FIG. 3(D), the level equal to the level of the control signal FIG. 3(B) minus level of the control signal FIG. 3(C). Both of the control signals reproduced are cancelled by each other at the optimum tracking phase 12. The abscissa of FIG. 3 shows the transporting phase shift of the magnetic tape, the right direction of the abscissa is the leading phase, and the left direction is the lagging phase respectively corresponding to the optimum tracking phase 12.

In the first embodiment, when the video head A reads out the control signal $c$, the transport of the magnetic tape 1 with respect to the video head A is decelerated whereas when the video head B reads out the control signal the magnetic tape transport is accelerated with respect to the video head B. That is when the control signals shown in FIG. 3(D) are maintained zero, the optimum tracking phase 12 may be maintained. The control circuit for accomplishing the above control is shown in FIG. 2. The signals reproduced by the video heads A and B are applied not only to a video signal amplifier 2 but also to filters 3 and 3$a$ which pass only the control signals. The control signals are applied to envelope demodulators 4 and 4$a$ whose output signals are applied to amplifiers 5 and 5$a$. The control signal from the video head B is inverted by an inverter 6 and applied to an adder 7. The output signal of the adder 7 is shown in FIG. 3(D), and is further amplified by a DC amplifier 8 so as to be applied to a brake coil 11 which serves to retard the rotation of a capstan 9 or a rotary head disk 10. The DC amplifier 8 is so arranged that when there is no control signal a predetermined current is normally applied to the brake coil 11. In this case the rotational speed of the capstan 9 is substantially equal to the speed when the tape speed is for the reproducing tracking matching. The signal as shown in FIG. 3(D) is applied from the adder 7 so that the brake current is increased or decreased. Thus the automatic optimum tracking matching phase 12 may be attained.

Figure 4:
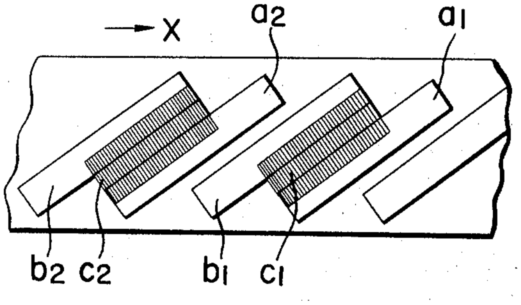
FIG. 4 shows a recording track pattern in accordance with a second embodiment of the present invention.
Figure 5:
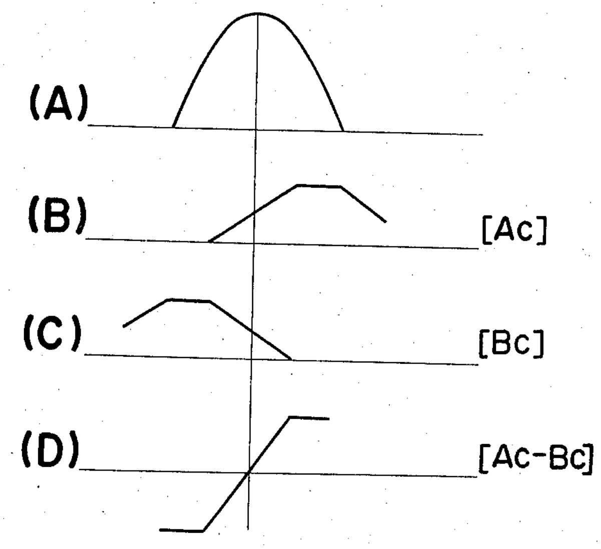
FIG. 5 shows the level of the signals reproduced from a magnetic tape of the second embodiment.

FIG. 4 shows a second embodiment of the present invention and FIG. 5 shows the signals reproduced from the magnetic tape shown in FIG. 4. In the first embodiment the control track $c_n$ is provided within the guard band between the video tracks $a_n$ and $b_n$, but in the second embodiment the control track $c$ overlaps the video tracks $a_n$ and $b_n$ by the same extent. The output signals of the second embodiment are shown in FIG. 5. As compared with those shown in FIG. 3, the phases of the control signals are displaced slightly, but the signal shown in FIG. 5(D) is substantially similar in waveform to that shown in FIG. 3(D). Therefore the control similar to that shown in FIG. 1 may be attained.

Figure 6:
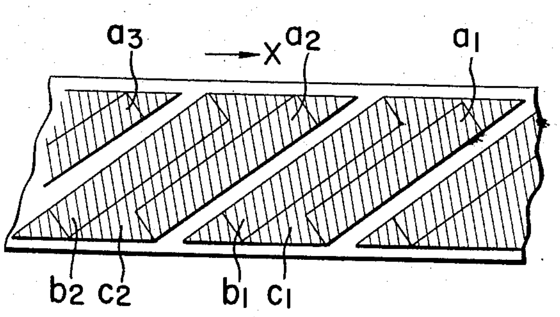
FIGS. 6–10 show the various recording track patterns in accordance with the present invention.

FIG. 6 shows a recording track pattern of a third embodiment of the present invention. In the third embodiment the control signal is recorded over a whole area in which a pair of video tracks $a_n$ and $b_n$ occupy. The control signal may be derived in a manner substantially similar to that described in connection with the first and second embodiments so that the similar control may be attained. In the third embodiment however the tape speed is accelerated when the level of the control signal derived from the head A falls whereas the tape speed is decelerated when the level of the control signal derived from the head B drops. To record the control signal $c$, a fixed head whose width is substantially equal to that of the tape is used to record the control signal all over the surface of the tape. When the video signals are recorded in the tracks $a_n$ and $b_n$, the space between the track $b_n$ and the track $a_{n+1}$ is erased by an erase head which rotates as in the case of the video heads. The present invention relates to the tracking matching in playback so that it will not limit the signal recording method at all.

Figure 7:
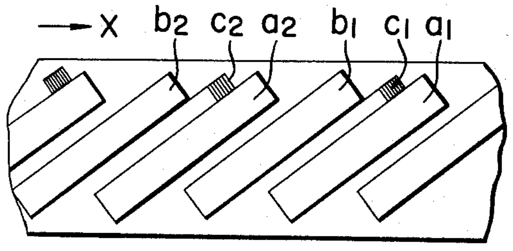

FIG. 7 shows a track pattern of a fourth embodiment of the present invention. Whereas the control signal is recorded substantially transversely of the tape in the first, second and third embodiments, the control signal c is recorded only in a small area at the end of the video track in the fourth embodiment so that the control signals are intermittently reproduced. But when the levels of the reproduced control signals are pooled, the similar control to those attained by the above three embodiments may be also attained. In the fourth embodiment, the control signals $c$ are shown as being recorded in parallel with the video tracks $a$ and $b$, but this recording method is not necessarily required. The control signals may be recorded in any suitable manner as far as the outputs of the control signals reproduced by the video heads are varied when the phase of the video heads with respect to the video tracks $a$ and $b$ is varied. For example a stationary control head may be used so as to record the control signals in the lengthwise of the tape substantially at the position similar to that shown in FIG. 7 so that the tracking control may be accomplished in response to the difference in level of the control signals reproduced by the two heads A and B.

Figure 8:
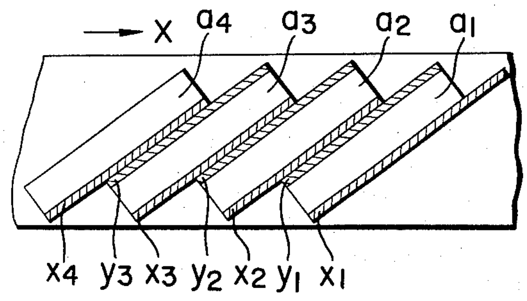

In a fifth embodiment shown in FIG. 8 different control signals $x_n$ and $y_n$ are recorded on both sides of the video track $a_n$. In the fifth embodiment one video head A simultaneously reproduces the video signal $a$ and the control signal $x$ or $y$. When the control signal $x$ is detected the tape speed is accelerated whereas when the control signal $y$ is detected the tape speed is decelerated. Whereas the above four embodiments are adapted for use with a video tape recording system of the type using two or more than two video heads, the fifth embodiment is adapted to be used with a VTR system of the type using only one head.

Figure 9:
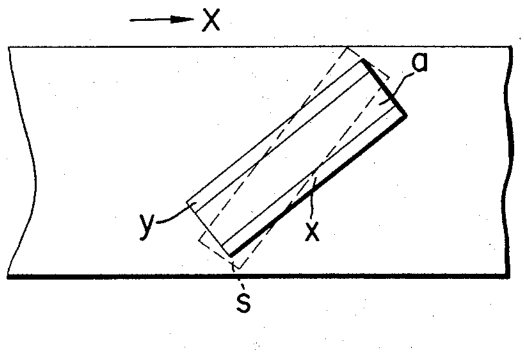

FIG. 9 shows a track pattern of a sixth embodiment of the present invention. As in the case of the fifth embodiment the control signals $x$ and $y$ are recorded on both sides of the video track $a$, but the control signals are used in controlling the position in still playback. In still playback the locus S of the head is inclined at an angle relative to the video track $a$ so that both of the positive and negative control signals $x$ and $y$ are reproduced in one scanning. Therefore in response to the ratio between the control signals $x$ and $y$ the signal for controlling the position may be derived. However opposed to the normal playback wherein the capstan or the rotary video head assembly is controlled, the tape reels are slightly rotated so as to slightly move the tape in its longitudinal direction.

Figure 10:
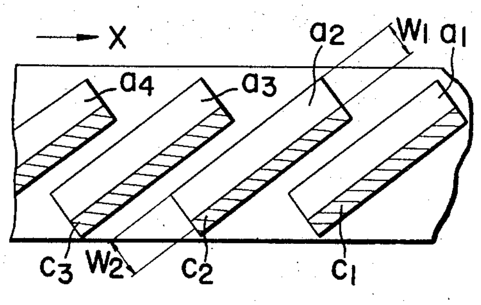
Figure 11:
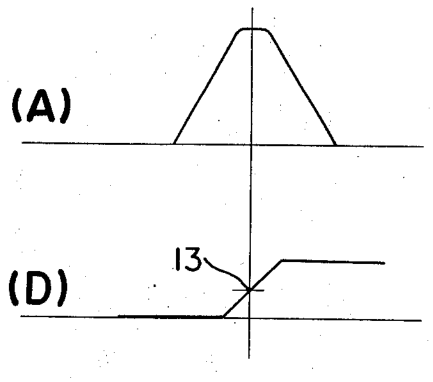
FIG. 11 shows the levels of the signals reproduced from a magnetic tape having a recording track pattern shown in FIG. 10.

FIG. 10 is a track pattern of a seventh embodiment of the present invention, and FIG. 11 shows the output signals. Whereas in the fifth embodiment the positive and negative control signals are recorded on both sides of the video track, only one control signal $c$ is recorded along one side of the video track $a$ in the seventh embodiment. When a head having a width $W_2$ slightly greater than the width $W_1$ of the video track $a$ is used, both of the whole width of the video track $a$ and a predetermined width of the control track may be simultaneously scanned. As shown in FIG. 11 the control signal as shown in FIG. 11(D) is obtained with respect to the video signal FIG. 11(A). Therefore by controlling the tape speed or the like so as to maintain the output level of the control signals constant the tracking matching in playback may be accomplished.

Figure 12:
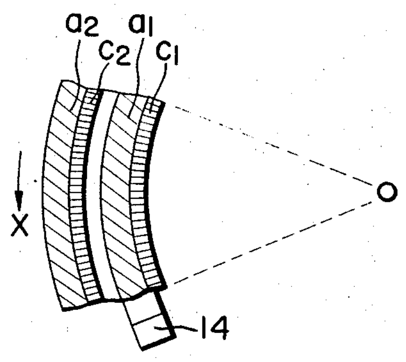
FIG. 12 shows a still another recording track pattern in accordance with the present invention.

FIG. 12 shows a track pattern of an eighth embodiment of the present invention in which the signals as the seventh embodiment are coaxially or helically recorded upon a disk or a sheet. In response to the signal similar to that in the seventh embodiment a head 14 is displaced radially, and this displacement is controlled. A helical tracks shown in FIG. 12 may be also applied to a cylindrical recording medium.

As described above according to the present invention no separate head for tracking matching in playback is required. Furthermore playback shifters or the like may be eliminated. Therefore the adjustment of the relative position between the video heads may be completely eliminated so that the reproducing systems may be fabricated at inexpensive cost. Moreover since the tracking matching may be accomplished automatically no manual adjustment is required.

What is claimed is:

1. An automatic tracking matching system for use with a device for reproducing the information recorded in the tracks in the predetermined direction comprising a. a recording medium upon which the control signals of a predetermined level which will not affect adversely the reproduced information signals are recorded in a direction parallel with the recording direction of an information signal recording track having a predetermined width and in predetermined relation therewith;

b. driving means for transporting said recording medium in a given direction;

c. means for simultaneously reproducing said information and control signals comprising a plurality of reproducing heads, each reproducing head positioned to simultaneously scan both the information and control signal tracks;

d. means for driving said reproducing means in a direction transverse to said given direction and alonng a path that passes each reproducing head simultaneously adjacent to both the recorded information track and the control signal track;

e. means for separating said control signals from said reproduced signals; and f. control means for controlling the relative speed between said recording medium drivinng means and said means for driving said reproducing means in response to said separated control signals so that the level of the control signals may be always maintained constant.

2. An automatic tracking matching system as defined in claim 1 wherein said reproducing means comprises a number of $n$ rotary elements, and said control signals are recorded for every $n$ information signal recording tracks in contact therewith where $n$ = integer.

3. An automatic tracking matching system as defined in claim 1 wherein said control signals are superposed upon said information signal track.

4. An automatic tracking matching system as defined in claim 1 wherein said control signal tracks are formed on both sides of said information signal track, and the frequency of the control signals recorded in one of said control signal tracks is different from that of the control signals recorded in the other control signal track.

5. An automatic tracking matching system as defined in claim 1 wherein said control signal is in the form of the control signals recorded over the whole surface of said recording medium but partly erased in parallel with said information signal track.

6. An automatic tracking matching system as defined in claim 1 wherein the width of said information signal reproducing means is not less than the width of said information signal track.

7. An automatic tracking matching system as defined in claim 1 wherein said control signal is shorter than said information signal track.

8. An automatic tracking matching system as defined in claim 1 wherein said given direction is a rotational direction;

the direction transverse to said given direction is radial with respect to the rotational direction;

both the control tracks and the information tracks are recorded in a spiral pattern upon a substantially planar recording medium.

9. An automatic tracking matching system as defined in claim 1 wherein said given direction is a rotational direction;

the direction transverse to said given direction is radial with respect to the rotational direction;

both the control tracks and the information tracks are recorded in a pattern of concentric circles upon a substantially planar recording medium.

10. An automatic tracking matching system as defined in claim 1 wherein said given direction is a rotational direction about a given axis;

the direction transverse to said given direction is parallel to said given axis;

both the control tracks and the information tracks are recorded in a helical pattern upon a cylindrical drum-type recording medium.

* * * * *

UNITED STATES PATENT OFFICE
CERTIFICATE OF CORRECTION

Patent No. 3,829,892 Dated August 13, 1974

Inventor(s) Michinori Nagahiro, et al

It is certified that error appears in the above-identified patent and that said Letters Patent are hereby corrected as shown below:

Column 1, Line 24: "Othhherwise" should be --Otherwise--

Line 65: "DDRAWING" should be --DRAWING--

Column 5, Line 35: "alonng" should be --along--

Line 41: "drivinng" should be --driving--

In the Claims:

Column 6, Line 25: After "signal" insert --track--

Signed and sealed this 19th day of November 1974.

(SEAL)
Attest:

McCOY M. GIBSON JR.
Attesting Officer

C. MARSHALL DANN
Commissioner of Patents

U-Wp-746 Hoshino

PO-1050 (10-69)

USCOMM-DC 60376-P69
* U.S. GOVERNMENT PRINTING OFFICE 1969 O-366-334